April 4, 1939.  S. F. GRAZIANO ET AL  2,153,042

BRAKE ADJUSTER

Filed March 3, 1937  2 Sheets-Sheet 1

INVENTORS
Sam F. Graziano
Sam J. Cicero

April 4, 1939.   S. F. GRAZIANO ET AL   2,153,042
BRAKE ADJUSTER
Filed March 3, 1937   2 Sheets-Sheet 2
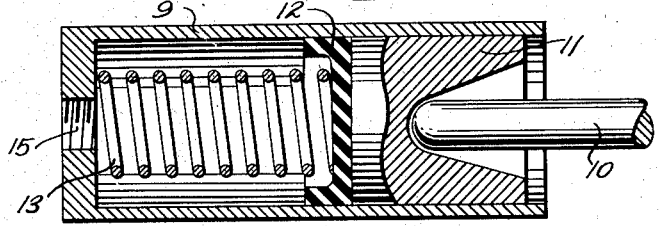
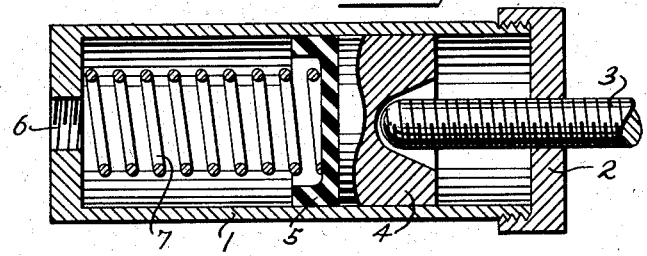
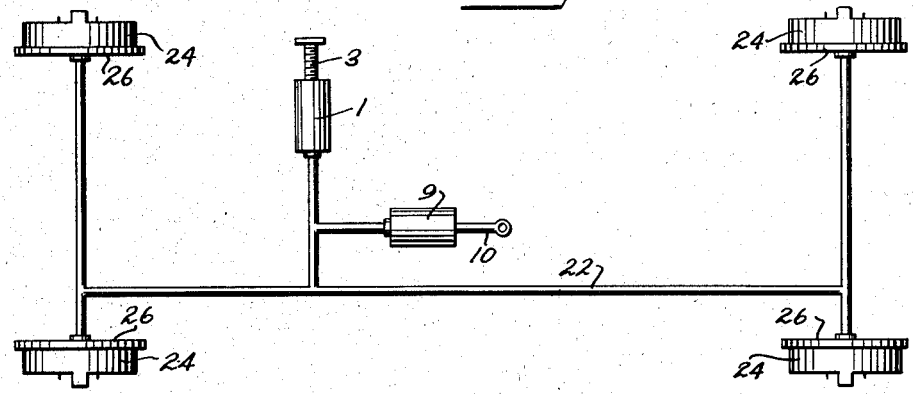
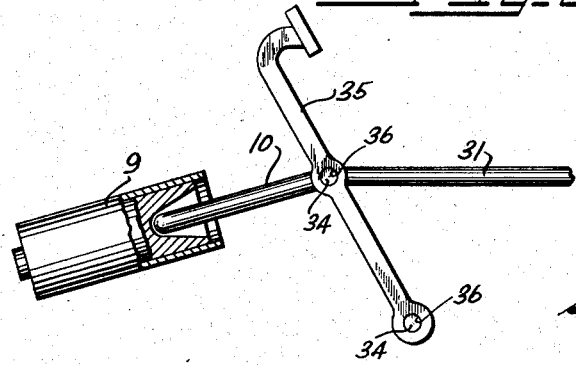
INVENTORS
Sam F. Graziano
Sam J. Cicero Patented Apr. 4, 1939

2,153,042

UNITED STATES PATENT OFFICE 2,153,042

BRAKE ADJUSTER

Sam F. Graziano and Sam J. Cicero, Tampa, Fla.

Application March 3, 1937, Serial No. 128,838

2 Claims. (Cl. 188—152)

The invention relates to improvements in adjusting brakes by adjusting all brakes on a vehicle from one point.

One feature of the invention is that it is applicable to all types of two shoe brakes, mechanically or hydraulically operated.

One important object relates to simplifying the wear adjustment of a brake of this type, by adjusting all shoes of all wheels from one point.

Figure 3 is a sectional view showing the auxiliary cylinder 9, of Figure 5;

Figure 4 is a sectional view showing the adjuster cylinder 1, of Figure 5;

Figure 5 is a more or less diagrammatic showing of a complete brake adjusting system according to our invention;

Figure 6 shows elevation view of auxiliary cylinder 9, pedal 35, brake operating means rod 31, rod 10 part of our system.

Figure 1:
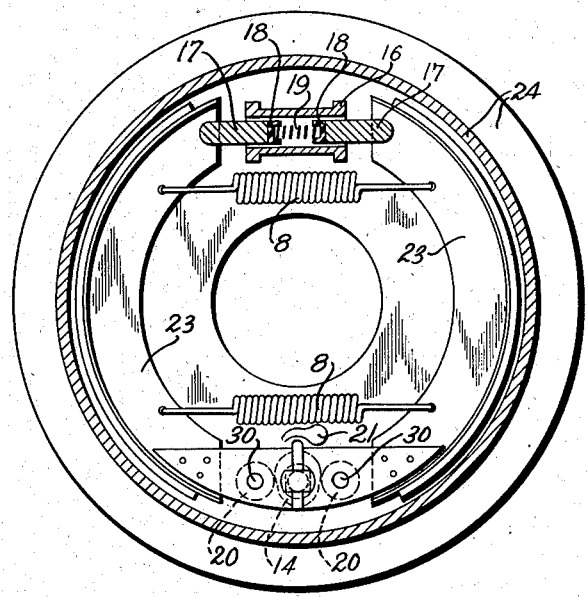
Figure 1 is a vertical section through a mechanical brake using our adjuster, which is shown in cross-section, just inside the head of the brake drum, showing the brake shoes in side elevation.

In the brake of Figure 1, there is a rotatable drum 24, at the open side of which is a support such as a novel backing plate 26, and within which is arranged the brake friction means, the brake shoes 23. In this type of braking system a rod or cable operates the cam 21, which presses wedge 14, down causing the wedge to spread the brake shoes 23, by the rollers 20, which are attached to the brake shoes by a novel pin 30. The springs 8, keep brake shoes 23, from dragging on brake drum 24. At the opposite end of the brake shoes 23, is where our invention comes into use and to advantage over other types of adjusters. The wheel cylinder 16, being under constant pressure of the desired amount applies this pressure on the pistons 17, they in turn press brake shoes 23, to the proper clearance toward the drum 24. The spring 19, is to keep the rubber packing cups 18, constantly in position against pistons 17.

Figure 2:
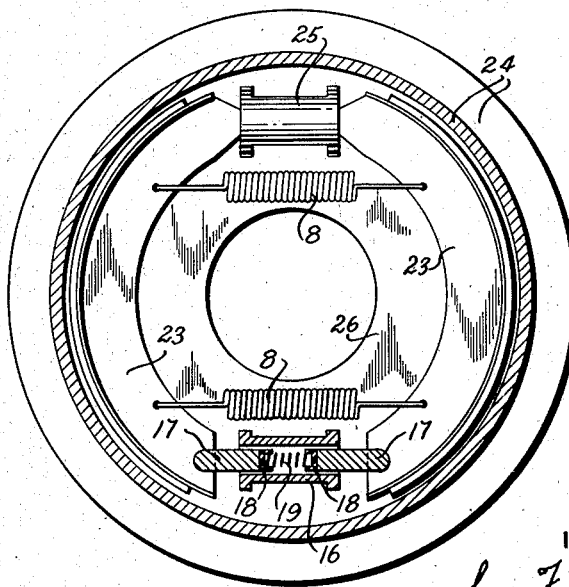
Figure 2 is a section corresponding to Figure 1, but showing a hydraulic brake.

In the brake of Figure 2, there is a rotatable drum 24, at the open side of which is a support such as a novel backing plate 26, and within which is arranged the brake friction means, the brake shoes 23. In this type of braking system the brakes are applied by a hydraulic braking cylinder 25, which is connected to a master cylinder which is actuated by the brake foot pedal. The springs 8, keep brake shoes 23, from dragging on brake drum 24. At the opposite end of the brake shoes 23, is where our invention comes into use in the same manner as previously explained in Figure 1.

Figure 3 is a sectional view of the auxiliary cylinder 9, which is attached to any convenient place near the brake pedal of the vehicle so that rod 10 is connected to said pedal. This cylinder 9 is placed into the system or made a part of the system to keep fluid in lines firm and constant. Rod 10, pushes piston 11, pressing the fluid within said cylinder into the lines 22, of Figure 5, thru opening 15, which is for line attachment. The spring 13, is used to keep the rubber packing cup 12, in its proper position against piston 11.

Figure 4 is a sectional view of the adjuster cylinder 1, which is attached horizontally to any part of the vehicle most convenient. The adjuster cylinder 1, consists of cylinder 1, spring 7, which is used to keep rubber packing cup 5, in its proper position against piston 4. Hand screw 3, screws into cylinder cap 2, which is screwed on the top of adjuster cylinder 1. The opening 6, is where lines 22, of Figure 5, are attached.

Figure 5 is a diagrammatic view of the complete brake adjuster which shows the adjuster cylinder 1, connected by lines 22, with the auxiliary cylinder 9, and the wheel cylinders, contained within the brake drum 24, and the backing plate 26, on which they are anchored. The fluid is fed into the system through the top of adjuster cylinder 1, which is screw-capped for this purpose. When all wheel cylinders, auxiliary cylinder 9, lines 22, and adjuster cylinder 1, are full of fluid the adjuster cylinder 1, is assembled as described previously for Figure 4. To adjust the brakes on the vehicle from one place, you simply turn hand screw 3, which presses fluid from the adjuster cylinder 1, into the lines 22, to the wheel cylinders, where in turn the fluid presses the pistons out ward on the brake shoes, to the drums until the proper clearance is obtained. The hand screw will thus hold the pressure constant at all brake shoes of the braking system of a vehicle. The auxiliary cylinder 9 comes into action when foot pedal is depressed, giving added pressure to the lines and thereby solidly supporting brake shoes.

Figure 6 shows foot pedal 35, rod 10 is attached to foot pedal 35, rod 31 of brake applying mechanism also connected to foot pedal 35. Rods 10 and 35 are both attached or connected by clevis pin 34. Rod 10 is part of our hydraulic brake adjuster system, as explained above, and rod 31 is to apply brake mechanism to bring vehicle to a stop, it is a part of brake operating means to spread brake shoes to bring rotation of drum to standstill. 36 is holes through which clevis pin 34 is put so as to connect rod 10 and rod 31 with brake pedal 35. Also cylinder 9 in relation to above parts.

We claim:

1. In combination with a brake having brake shoes and an operating means therefor, an hydraulic brake adjuster comprising a fluid operated device placed at the ends of the brake shoes opposite the brake shoe operating means and serving as a support for said shoes; a manually operable cylinder device serving as a means to adjust and hold to permanent adjusted position said fluid operated device; and a cylinder device connected to said fluid operated device by conduits, and adapted, when positively operated during application of the brake shoes, to keep constant firmness of fluid in said fluid operated device and connecting conduits.

2. In combination with brakes on a vehicle each having brake shoes and an operating means therefor, an hydraulic brake adjuster comprising fluid operated devices placed at the ends of the brake shoes opposite the brake shoes operating means and serving as a support for said shoes; a manually operable cylinder device serving as a means to adjust and hold to permanent adjusted position said fluid operated devices; and a cylinder device connected to said fluid operated devices by conduits, and adapted, when positively operated during application of the brake shoes, to keep constant firmness of fluid in said fluid operated devices and connecting conduits, to adjust all brake shoes on a vehicle, at the same time.

SAM F. GRAZIANO.
SAM J. CICERO.